United States Patent [19]

Funk et al.

[11] 3,775,735

[45] Nov. 27, 1973

[54] APPARATUS FOR SCANNING AN UNDERWATER AREA

[75] Inventors: Clarence J. Funk; Ivor P. Lemaire; Jerry L. Sutton; Frederick A. Marrone, all of San Diego, Calif.

[73] Assignee: The United States of America as represented by the Secretary of the Navy, Washington, D.C.

[22] Filed: May 1, 1972

[21] Appl. No.: 249,059

[52] U.S. Cl. ............... 340/4 R, 178/6.6 R, 350/6, 356/4
[51] Int. Cl. ............................................. G01j 1/00
[58] Field of Search.................. 340/4 R; 356/4, 5; 350/6, 7; 343/5 CM, 5 PC; 178/6.6 R

[56] References Cited
UNITED STATES PATENTS
3,533,697  10/1970  Hughes ................................. 356/5

Primary Examiner—Richard A. Farley
Attorney—Richard S. Sciascia et al.

[57] ABSTRACT

The apparatus of this invention is designed to be generally operated from either a towed or self-propelled underwater vehicle. A nearly collimated beam of light from a rotating cylinder traces a narrow strip of the target area during each rotation. The strip is substantially perpendicular to the direction of travel of the apparatus. During subsequent rotations, a series of parallel strips are traced on the target area. The speed of rotation and corresponding raster scan on the display monitor is synchronized to the forward speed of the vehicle to which the apparatus is attached. The instantaneous field of view of the receiving optics is stopped down so that only the light from a small area at the center of the intersection of the collimated source beam and the target area is viewed. The size of this area corresponds to the minimum resolution element of the device. The location of the field stop of the receiving optics is a function of the viewing range, and is adjusted accordingly. The automatic gain control on the output signal from the photomultiplier tube compensates for the varying propagation losses due to varying path lengths in the mapping geometry. The intensity displayed at a particular spot on the video monitor or stored at a given location on the video tape is therefore a map of the optical reflectivity of the corresponding spot on the surface of the target area.

10 Claims, 4 Drawing Figures

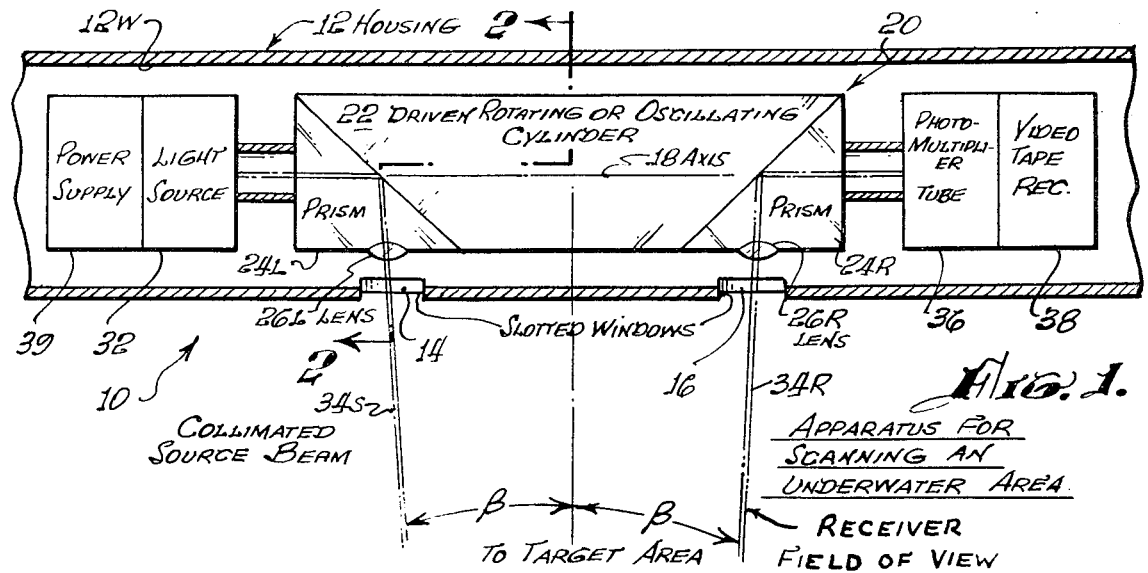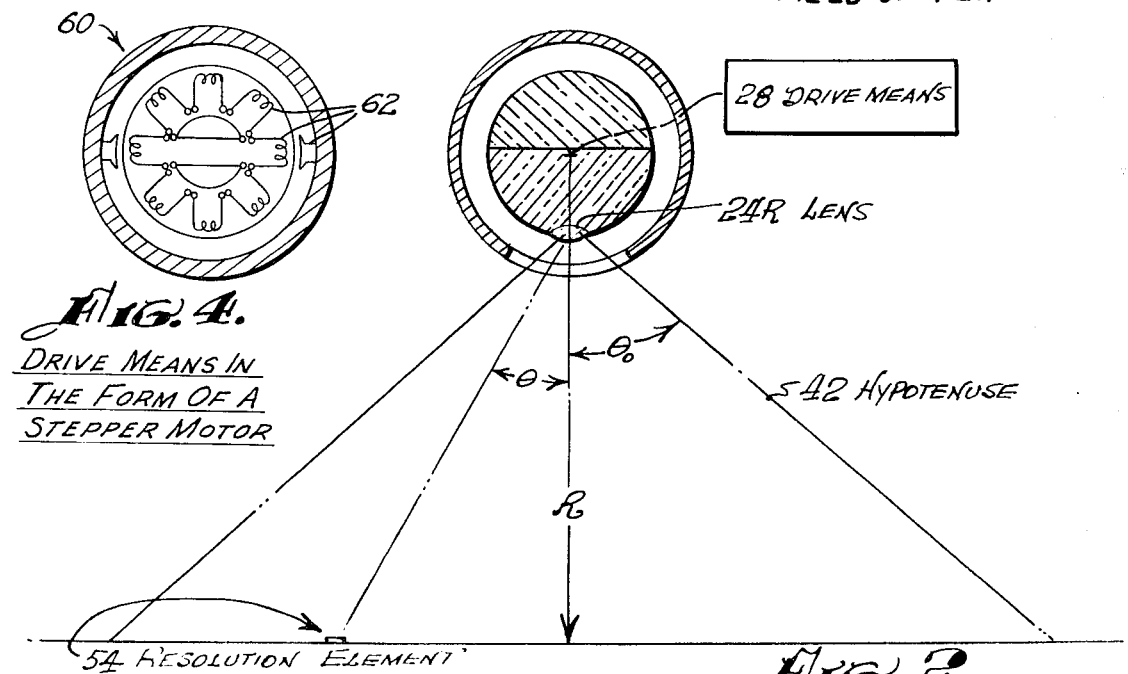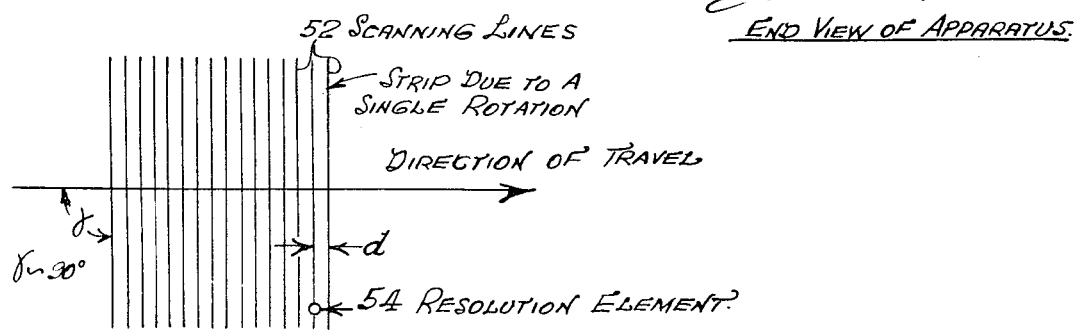

APPARATUS FOR SCANNING AN UNDERWATER AREA

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

There are spot scanning systems in the prior art mounted on airplanes, but these systems are incapable of mapping an underwater target area. In the line scanning prior art methods, every part of the line has the same intensity, for all practical purposes, however, in underwater scanning, this is not true because of the rapid attenuation of a light beam in water. A point in the middle of any line would reflect light of much greater intensity than light reflected from either end of the same line, since the distance traveled by the incident beam of light to the middle of each line is considerably less than to the ends of the same line, and hence the light intensity is attenuated less in the middle of the line. Since light attenuates exponentially underwater, this factor must be taken into consideration in any system used for underwater viewing.

SUMMARY OF THE INVENTION

This invention relates to an apparatus which optically maps underwater surfaces, displays the mapped image in real time on a cathode ray tube, or stores the image in a video tape recorder. In operation the device is attached to either a towed or self-propelled underwater vehicle.

The apparatus includes the following basic components:

1. a point light source which is spectrally optimized for underwater transmission;
2. collecting and collimating optics for the light source;
3. a dual prism and lenses mounted in a rotating cylinder;
4. receiving optics, for receiving the beam of light reflected from the target;
5. a photomultiplier tube, for converting the received beam of light into an electrical signal;
6. automatic gain control electronics, to compensate for the variable attenuation of the incident and reflected light beams;
7. a display cathode ray tube; or
8. a magnetic tape recorder, to display or record the target area;
9. a power supply, to supply energy where needed; and
10. underwater housings.

OBJECTS OF THE INVENTION

An object of the invention is to provide an apparatus for scanning an underwater area which may be used either on a moving vehicle or on a stationary platform.

Another object of the invention is to provide an apparatus for scanning an underwater target area which compensates for the differences in length of the beam path at various parts of the linear scan.

Yet another object of the invention is to provide an apparatus which may be used for night time surveillance of a target area.

Other objects, advantages and novel features of the invention will become apparent from the following detailed description of the invention, when considered in conjunction with the accompanying drawings, wherein:

BRIEF DESCRIPTION OF THE DRAWINGS

FIG. 1 is a partially cross-sectional, partially diagrammatic view of the apparatus for scanning an underwater area.

FIG. 2 is a cross-sectional end view of the apparatus.

FIG. 3 is a diagrammatic view of the scanning pattern over the target area.

FIG. 4 is a cross-sectional and schematic end view of the apparatus showing a stepper motor for incrementally scanning an underwater area.

DESCRIPTION OF THE PREFERRED EMBODIMENTS

Referring now to FIG. 1, this figure shows an apparatus 10 for linearly scanning, point by point, a target area (not shown), generally underwater, comprising a housing 12, having an interior cylindrical wall 12W, the cylindrical surface defining an axis 18, which has two slots, 14 and 16 through it perpendicular to the axis of the wall.

A rotating, cylindrical scanning assembly 20, comprises a driven cylinder 22 disposed within the housing, the cylinder being truncated at each end at approximately 45° to a plane through the axis 18 of the cylinder, so that in this plane the cross section is trapezoidal. The axis of the driven cylinder 22 and that of the wall 12W are coincident.

Two transparent, right, cylindrical prisms, 24L and 24R, truncated at approximately 45°, have the same diameter and the same axis of rotation 18 as the driven cylinder 22, each prism bonded by at least part of its elliptical face to the corresponding surface at each end of the driven cylinder. The prisms, 24L and 24R, of course need not be truncated cylindrical prisms, but may be the ordinary prisms, which are truncated rectangular solids.

The scanning assembly 20 further comprises a pair of lenses, 26L and 26R, one mounted to each prism, 24L and 24R, respectively, at the cylindrical surface thereof so that they rotate with the prisms, the principal axis of each of the lenses being convergent toward each other so that the axes may be made to intersect, through the slots, 14 and 16, in the housing, at some point in the plane of the drawing, the point of intersection coinciding with the point of the target being scanned. As shown, the left and right lenses, 26L and 26R, are bonded by a thin transparent cement, not shown, directly to the left and right prisms, 24L and 24R. However, in another arrangement, the lenses 26L and 26R could be mounted in such a way as to be supported by, but separated from, the prisms 24L and 24R.

Driving means, 28 in FIG. 2, for rotating the scanning assembly 20, and therefore the lenses, 26L and 26R permit scanning a line of the target area at a time, the line being substantially perpendicular to the axis 18 of the cylinder.

The period of rotation for the cylindrical assembly 20 is $$T = (\pi/180)(\epsilon R/v),$$

where $\epsilon$ is the angular resolution of the aparatus 10 in degrees. R (see FIG. 2) is the minimum one-way range of the device, and v is the speed of the vehicle. Typical values for these parameters are $\epsilon = 0.25°$, R = 100 ft., and v = 15 ft/sec. The corresponding value for T is 0.029 sec.

The resolution of the apparatus 10 in line pairs is $$N = \theta_o/\epsilon = 210 \text{ line pairs}$$

where the half-angle field of view, $\theta_o$, also shown in FIG. 2, is assumed to be 52.5°. The apparatus 10 shown in FIG. 1 may further comprise a light source 32, for generating a beam of light along the axis 18, and toward the internally reflecting surface of, one of the prisms 24L, thereby projecting a beam of collimated light 34S onto the point of the target being scanned.

A photodetector, for example, a photomultiplier tube 36, is adapted to receive the beam of light 34R reflected from the scanned point, which is first received by the right lens 26R, and then passes through the other prisms 24R.

Two versions of employing the photodetector 36 may be embodied: (1) The field of view of the reflected beam of light 34R is stopped down at the photodetector 36; or (2) the diameter of the beam of light 34S at the source is made as small as possible.

The advantage in using a larger reflected beam of light 34R is that it ameliorates the synchronization of aiming the reflecting lens 24R upon the exact spot of the target which is being illuminated and no other. If the returning beam of light 34R is stopped down too much, then a synchronization problem arises, namely, synchronization of the incident beam of light 34S aimed at the target, and the aiming of the reflecting, or receiving, lens 26R so that it is aimed at precisely the same point.

If the apparatus 10 is to be used underwater, it would further comprise an automatic gain control circuit (not shown), whose input is connected to the output of the photodetector 36, to compensate for the variations in the intensity of the received light 34R due to the varying length of the scanning and received beams of light at different parts of the line, 52 in FIG. 3, of the target being scanned.

If the scanning angle, $2\theta_o$ in FIG. 2, is relatively small so that the hypotenuse 42 has a length approximately the same as that of the perpendicular R, then an automatic gain control circuit is not required.

A calculated gain control could be used on the output signal from the photomultiplier tube. For a Lambertian surface the ratio of the light intensity incident on the receiver is $$\text{ratio} = \exp\{-2\bar{\alpha}R(1-\cos\theta/\cos\theta)\} \cos^2\theta,$$

when comparing the light reflected from a target element at the angle $\theta$ with that from the center of the field of view, as shown in FIG. 2.

A Lambertian surface is a standard diffuse surface such that light reflected off it has the same intensity in all directions. The value of the parameter $\bar{\alpha}$, would be adjusted so that the output signal of the gain control devices would have a constant direct-current level. The value of $\bar{\alpha}$, the effective attenuation coefficient, could also be recorded on a different track of the video tape so that a record of the optical properties of the water could be obtained simultaneously with a map of the surface's optical reflectivity.

As is shown in FIG. 1, the apparatus 10 may further comprise a video tape recorder 38 whose input is connected to the output of the automatic gain control circuit, if present, for recording the target area on video tape.

In addition, the apparatus may further comprise a power supply 39, to furnish energy for the driving means 28, light source 32, automatic gain control circuit, and the video tape recorder 38.

The apparatus 10 may be used in a manner wherein the housing 12 is adapted for mounting to a moving vehicle, a line (52 in FIG. 3) of the target area being scanned at a time as the vehicle moves forward.

On the other hand, the apparatus may further comprise a stepper motor, 62 in FIG. 4, for incrementally tilting the prisms, 24L and 24R, in a direction substantially at right angles to the scanning lines, 52 in FIG. 3, an increment being equal to the distance d between two adjacent scanning lines, thereby permitting scanning of an area to be accomplished from a stationary platform. The duty cycle for the apparatus 10 with a rotating cylinder is $$\text{duty cycle} = 2\theta_o/360°$$

where $\theta_o$ is the half-angle field of view, as shown in FIG. 2. The duty cycle for the apparatus 10 with stepper motors would be nearly one.

Instead of making complete revolutions, the apparatus 10 may include a scanning assembly 20 wherein the rotation is less than 360°, so that the scanning assembly oscillates back and forth, the included angle of oscillation being sufficient to encompass the width of the target area. This type of embodiment would include a stepper motor, 62 in FIG. 4, which could also be used to change the pitch of the source prism within the rotating cylinder, causing the oscillation to progress in small incremental steps, rather than in one continuous oscillation. This allows the collimated source beam to 34S be scanned longitudinally, and hence the apparatus 10 could be used as a stationary volume-scanning imaging system. It is very desirable that the stepper motor be able to make the increments of the steps as small as the optical resolution 54, in FIG. 3, of the apparatus 10.

In another embodiment of an apparatus for linearly scanning a target area, instead of the pair of prisms, 24L and 24R, a pair of mirrors, one attached to each end of the cylinder 22 are used. The pair of mirrors are mounted to the driven cylinder 22 in a manner so that they rotate with the cylinder. The light source 32 generates a beam of light along the axis 18 of the cylinder, and toward the reflecting surface of one of the mirrors, thereby projecting a beam of light 34R through one of the lenses 26L and onto the point being scanned. A photodetector receives the beam of light 34R reflected from the scanned point, which is first received by the other lens 26R and then passes to the other mirror.

The automatic gain control circuit serves the same function as in the embodiment 10 described in detail hereinabove.

Instead of the video tape recorder 38, of the apparatus 10 shown in FIG. 1, the second embodiment includes a video display, including a cathode-ray tube (CRT), whose input is connected to the output of the automatic gain control circuit, for displaying the target area on the screen of the CRT.

When using a video display, including a cathode-ray tube, a video signal, which is the output of the photomultiplier, forms the input to the video display. The scanning of the video signal is done by the same electronics that causes scanning of the spot of the cathode-ray tube. The horizontal and vertical synchronization rates may be determined, as indicated hereinbelow, from the required vertical rate of scan, which is related to the speed of the vehicle on which the apparatus is mounted, and the designed horizontal resolution of the apparatus. The scan of the electron beam of the CRT is synchronized with the optical scan of the light beam.

The cathode-ray tube would either have to be a long-persistence type or some means of storage of the video information would have to be provided, so that most of the video information would remain on the screen and only new information would have to be entered.

Essentially, when used on a moving vehicle, all lines 52 of the image would move upwardly one line at a time, and only a new, bottom, line would be entered onto the prior image. Thus, the image seen on the CRT screen would correspond to the actual image under the moving vehicle at all times. The image on the CRT screen would move across the screen at the same rate as the apparent movement of the target area.

In yet another embodiment, an oscillating cylinder driven by an eccentric on a rotating gear could be used to azimuthally direct the light source and receiving optics. The duty cycle for this device would be nearly one. Also the varying angular speed of the cylinder would somewhat compensate for the non-uniform transverse scan speed across the surface of the object. The transverse scan speed is related to the angular speed by $$(ds/dt) = (d/dt)\ (R\ \tan\theta) = (R/\cos^2\theta\ (d\theta/dt)).$$

A further refinement of the apparatus for scanning an underwater target area involves optical signal processing to improve the image quality. Because of the finite size of the scanning point, the picture quality will be somewhat blurred. The picture quality may be improved by spatial filtering. This will enable "sharpening up" the contrast of the image at the edges. It would crispen the quality of the picture, rather than leaving it subdued.

The advantages and new features of the apparatus 10 of the invention are:
a. The apparatus 10 effectively utilizes the method of volume scanning to eliminate backscattered light.
b. The rotating cylindrical assembly 20 insures the azimuthal synchronization of the light source and receiver.
c. The adjustable receiver field stop insures range synchronization of the light source 32 and the receiving optics.
d. The apparatus 10 has tremendous source gain over a conventional wide angle viewing system by concentrating all of the power emitted by the light source 32 in a nearly collimated beam 34S. If the nearly collimated beam 34S has a half angle of 0.5°, while the half angle of the wide angle viewing system is 52.5°, the corresponding source gain of the system is $$SG = 10\ \log\ \{1 - \cos(52.5°)/1 - \cos(0.5°)\} = 40\ db$$

e. The apparatus 10 utilizes the high sensitivity and large dynamic range of the photomultiplier tube 36 as the receiver element in an underwater mapping system.
f. The automatic gain control on the output signal of the photomultiplier 36 compensates for varying propagation losses which are inherent in a wide angle imaging or mapping system which operates in an absorbing medium.
g. The apparatus 10 can obtain a continuous record of the optical properties of the water.
h. The apparatus 10 operates in real time.
e. The cost of the apparatus 10 appears to be less than alternative methods.

Although basically the invention is designed to be used for mapping an underwater target, the apparatus may also be used for mapping above ground terrain, using a laser beam as a light source. For such use, the automatic gain control circuit would not be required.

Obviously many modifications and variations of the present invention are possible in the light of the above teachings. It is therefore to be understood that within the scope of the appended claims the invention may be practiced otherwise than as specifically described.

What is claimed is:
1. An apparatus for linearly scanning, point by point, a target area, generally underwater, comprising:
a housing, having an interior cylindrical wall, the cylindrical surface defining an axis, the housing having two slots through it perpendicular to the axis of the wall;
a rotating, cylindrical scanning assembly, disposed within the cylindrical wall of the housing, comprising:
a driven cylinder disposed within the housing, the cylinder being truncated at each end at approximately 45° to a plane through the axis of the cylinder, so that in this plane the cross section is trapezoidal;
two transparent, right, cylindrical prisms, truncated at approximately 45°, having the same diameter and the same axis of rotation as the driven cylinder, each prism bonded by at least part of its elliptical face to the corresponding surface at each end of the driven cylinder; and
a pair of lenses, one mounted to each prism at the cylindrical surface thereof so that they rotate with the prisms, the principal axis of each of the lenses being convergent toward each other so that the axes may be made to intersect, through the slots in the housing, at some point in said plane, the point of intersection coinciding with the point of the target being scanned; and
driving means for rotating the scanning assembly, and therefore the lenses, thereby scanning a line of the target area at a time, the line being substantially perpendicular to the axis of the cylinder.

2. The apparatus according to claim 1, further comprising:
a light source, for generating a beam of light along the axis of, and toward the internally reflecting surface of, one of the prisms, thereby projecting a beam of light through one of the lenses and onto the point being scanned; and
a photodetector, adapted to receive a beam of light reflected from the scanned point, which is first received by the other lens and then passes through the other prism.

3. The apparatus according to claim 2, further comprising:
an automatic gain control circuit, whose input is connected to the output of the photodetector, to compensate for the variations in the received light intensity due to the varying length of the scanning and received beams of light at different parts of the line of the target being scanned.

4. The apparatus according to claim 3, further comprising:
a video tape recorder, whose input is connected to the output of the automatic gain control circuit, for recording the target area on video tape.

5. The apparatus according to claim 4, further comprising:
a power supply, to furnish energy for the driving means, light source, automatic gain control circuit, and the video tape recorder.

6. The apparatus according to claim 5, wherein the housing is adapted for mounting to a moving vehicle, a line of the target area being scanned at a time as the vehicle moves forward.

7. The apparatus according to claim 5, further comprising:
a stepper motor for incrementally tilting the prisms in a direction substantially at right angles to the scanning lines, an increment being equal to the distance between two adjacent scanning lines, permitting scanning of an area to be accomplished from a stationary platform.

8. The apparatus according to claim 1, wherein the rotation is less than 360°, so that the scanning assembly oscillates back and forth, the included angle of oscillation being sufficient to encompass the width of the target area.

9. The apparatus according to claim 8, wherein the driving means for rotating the scanning assembly comprises:
a stepper motor, which causes the oscillation to progress in small incremental steps, rather than in one continuous oscillation.

10. An apparatus for linearly scanning, point by point, a target area, generally underwater, comprising:
a housing, having an interior cylindrical wall, the cylindrical surface defining an axis, the wall having two slots through it perpendicular to the axis of the wall;
a rotating, cylindrical scanning assembly, disposed within the cylindrical wall of the housing, comprising: a driven cylinder disposed within the housing, the cylinder being truncated at each end at approximately 45° to a plane through the axis of the cylinder, so that in this plane the cross section is trapezoidal;
a pair of mirrors, one attached to each end of the cylinder;
a pair of lenses mounted to the cylinder in a manner so that they rotate with the cylinder, the principal axis of each of the lenses being convergent toward each other so that the axes may be made to intersect, through the slots in the housing, at some point in said plane, the point of intersection coinciding with the point of the target being scanned;
driving means for rotating the scanning assembly, and therefore the lenses, thereby scanning a line of the target area at a time, the line being substantially perpendicular to the axis of the cylinder;
a light source, for generating a beam of light along the axis of, and toward the reflecting surface of, one of the mirrors thereby projecting a beam of light through one of the lenses and onto the point being scanned; and
a photodetector, adapted to receive a beam of light reflected from the scanned point, which is first received by the other lens and then passes through the other mirror;
an automatic gain control circuit, whose input is connected to the output of the photodetector, to compensate for the variations in the received light intensity due to the varying length of the scanning and received beams of light at different parts of the line of the target being scanned;
a video display, including a cathode-ray tube, whose input is connected to the output of the automatic gain control circuit, for displaying the target area; and
a power supply, to furnish energy for the driving means, light source, automatic gain control circuit, and the video display.

* * * * *